United States Patent

[11] 3,610,476

| [72] | Inventor | James R. Starrett |
| | | Springfield, Ohio |
| [21] | Appl. No. | 848,025 |
| [22] | Filed | Aug. 6, 1969 |
| [45] | Patented | Oct. 5, 1971 |
| [73] | Assignee | The Bauer Bros. Co. |
| | | Springfield, Ohio |

[54] ROTARY VALVE
23 Claims, 7 Drawing Figs.

[52] U.S. Cl. ................................................. 222/194,
92/7, 214/17, 302/49
[51] Int. Cl. .................................................. B67d 5/54
[50] Field of Search .......................................... 222/194;
302/49; 214/17.68; 92/7

[56] References Cited
UNITED STATES PATENTS
2,680,683   6/1954   Obenshain ..................... 222/194 X

| 2,858,212 | 10/1958 | Durant et al. | 302/49 X |
| 2,933,208 | 4/1960 | Green | 214/17 |
| 2,960,245 | 11/1960 | Knapp | 214/17 |
| 3,178,235 | 4/1965 | Zimmermann | 302/49 |

Primary Examiner—Samuel F. Coleman
Attorney—Jerome P. Bloom

ABSTRACT: A rotary material handling valve particularly useful in the pulping industry featuring means for improved valve discharge and further characterized by a system for achieving improved pressure and temperature balance in the operation of the valve rotor, there being means for relieving end bell cavities to rotor pockets at a position to advantageously condition the materials therein and in the process thereof reduce pressure and temperature differentials across the rotor rims.

INVENTOR
JAMES R. STARRETT

BY Jerome P. Bloom
ATTORNEY

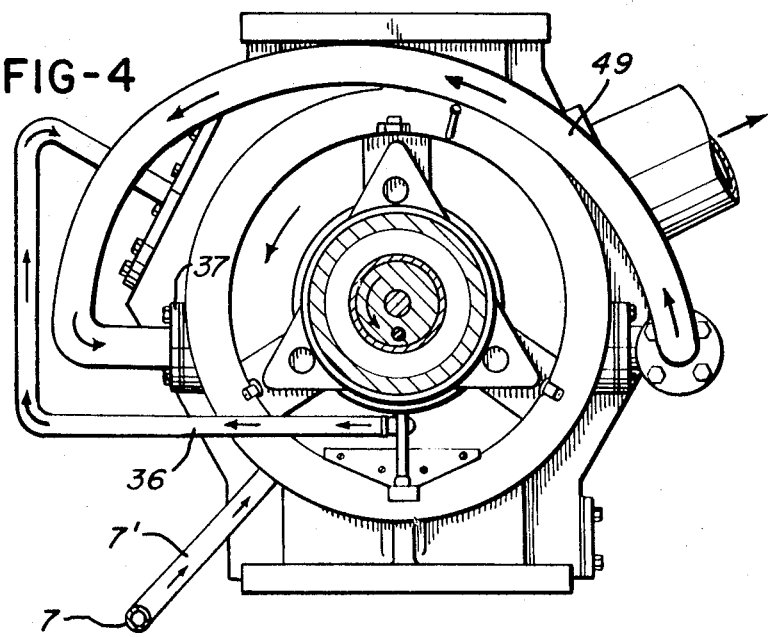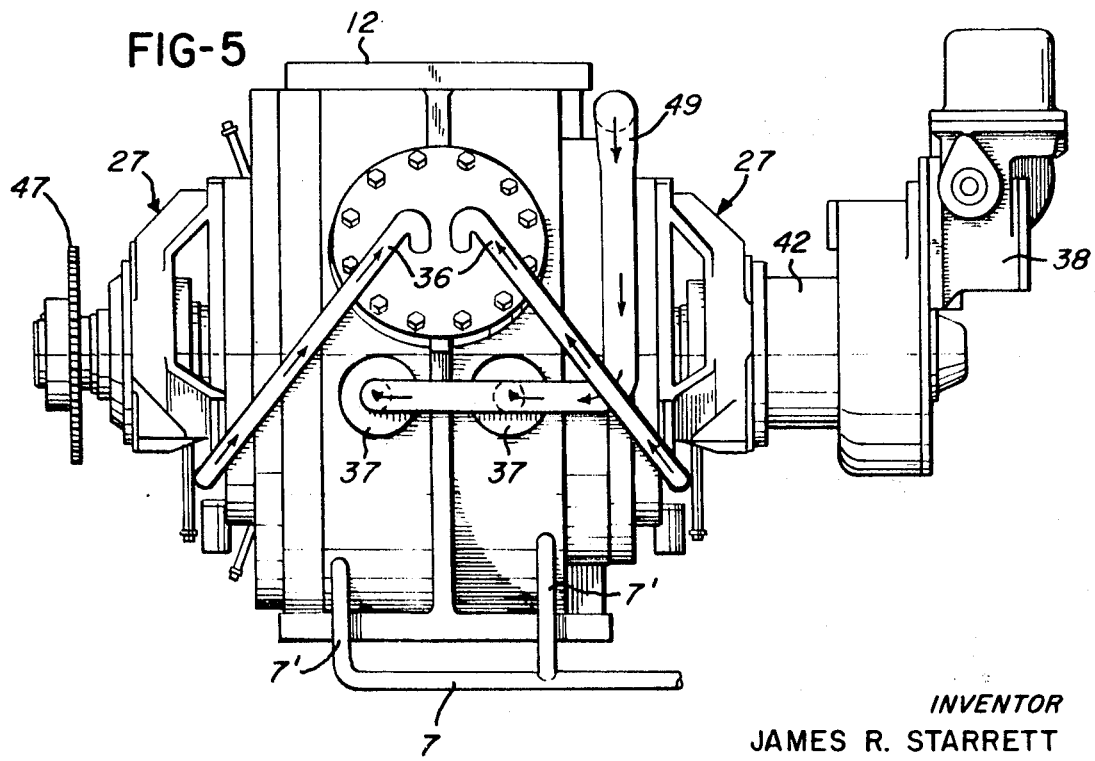

INVENTOR
JAMES R. STARRETT

BY *Jerome P. Bloom*

ATTORNEYS 3,610,476

ROTARY VALVE

BACKGROUND OF THE INVENTION

This invention relates to rotary valves and to improvements in material handling valves useful in the broad pulping industry for feeding chips or coarse or fine ground material to and from a pressurized vessel. It is particularly advantageous where the materials handled are in a wet-clinging form. The invention will be so described, although neither the form of its embodiment here illustrated nor the application thereof is so limited.

Material handling valves are quite vital in the pulping industry, regardless of the end use for which the pulp is intended. For example, pressurized vessels such as digesters, bleach towers, or tanks for other types of chemical treatment, require input and discharge valves capable of not only maintaining a pressure seal but also of providing an effective and efficient transmittal of the material being worked. Such valves are normally of a rotary type, operate under heavy loads and have produced many problems in their use.

Valves of this type have heretofore been subject to considerable unbalance and substantial wear, requiring a good deal of maintenance or replacement of parts. A further and more serious problem evidenced in the use of prior art material handling valves is the difficulty in fully discharging their contents to a pressurized environment when dealing with fine, wet, clinging-type materials. For reasons such as these, they generally have developed less than the desired operating efficiency.

The above problems remain even though the prior art valves have been progressively improved over the years so as to eliminate or reduce the seriousness of various individual problems originally encountered. In this respect, for example, means have heretofore been provided for improving the discharge of rotor pockets to a pressurized environment, reducing the pressure within the pockets in successive stages following the discharge of their contents, and for more nearly equalizing temperatures and pressures in the valve end bells to either end of the rotor. For this, see U.S. Pat. 3,219,393 which issued Nov. 23, 1965. Also, subsequently, a conduit was added to connect each rotor pocket immediately following the discharge of its material contents with another rotor pocket immediately subsequent to its receiving a fresh charge of material. In this way, steam or other conditioning fluid under pressure was vented from the one to the other to pressurize the new charge just received. The addition of this improvement had the effect of causing a reduction of erosion of parts and the liner wear incident to prior methods of steam venting. Moreover, this also provided for a better use of the available steam and its energy content. This last improvement is shown in U.S. Pat. No. 3,273,758 which issued Sept. 20, 1966. Even with such improvements in construction, however, the end bell cavities of the conventional valve still remain under high steam pressure and the feeding of wet materials has remained a problem. The former is due to the required operating clearance for the valve rotor. Under such conditions there is considerable pressure differential across the rims or ends of the rotor. Where the valve is utilized to receive material under low pressure and temperature conditions and discharges to a high pressure and temperature environment, such pressure differential materially increases after a rotor pocket passes the outlet or discharge opening from the valve and moves to align with the valve inlet. It is at a maximum when the rotor pocket is in a position to accept a new charge of material to be processed, at which point the pocket is exposed in this instance to a lower temperature environment.

SUMMARY OF THE INVENTION

The present invention obviates or minimizes the above-noted problems in the application and use of the prior art rotary material handling valves. It provides means facilitating the application to the rotor pockets of fluid in a manner to load a charge therein from the rear immediately prior to discharge. The fluid is end loaded so as to produce at the base and sides of each rotor pocket a concentrated layer of fluid which has a flow velocity to scour the pocket's surface and lift therefrom any particles which tend to cling. This produces a skin effect which surrounds the charge with a pressure which produces a forceful ejection of the charge on exposure to the valve outlet. The invention further provides for the unloading of end bell steam in a manner to lend itself to the creation of a substantially better temperature and pressure balance across the rims of the valve rotor than heretofore provided.

Thus, the primary object of the invention is to provide an improved construction for rotary valves rendering them economical to fabricate, yet more efficient and satisfactory in use, adaptable to a wide variety of application and low in operating cost.

A further object of the invention is to provide a rotary valve particularly advantageous for use in transferring materials to or from a vessel operating under conditions of elevated pressure and temperature.

Another object of the invention is to provide means for improving the discharge of wet clinging material from a material handling valve.

A further object of the invention is to provide a novel rotary valve having features enabling therein an improved pressure and temperature balance and lending themselves to improving the valve discharge characteristics and the handling of materials which normally tend to cling to a valve rotor.

A further object of the invention is to provide a rotary valve in which the pressure differential therein is minimized, in comparison with rotary valves heretofore employed.

A further object of the invention is to provide a rotary valve having improved dimensional stability.

Another object of the invention is to provide a rotary valve construction providing increased life for the rotor shaft seals.

A further object of the invention is to provide a rotary valve with novel and more efficient and effective means for inhibiting leakage material.

An additional object of the invention is to provide a rotary valve possessing the advantageous structural features, the inherent meritorious characteristics and the mode of operation herein mentioned.

With the above primary and other incidental objects in view, as will more fully appear in the specification, the invention intended to be protected by Letters Patent consists of the features of construction, the parts and combinations thereof, and the mode of operation as hereinafter described or illustrated in the accompanying drawings or their equivalents.

Referring to the accompanying drawings wherein is shown one but obviously not necessarily the only form of embodiment of the invention, FIG. 1 is a longitudinal cross-sectional view of a rotary valve unit embodying the concepts of the present invention;

FIG. 4 is a view taken on line 4—4 of FIG. 1;

FIG. 5 is a longitudinal side view of the rotary valve;

Like parts are indicated by similar characters of reference throughout the several views.

Figure 1:
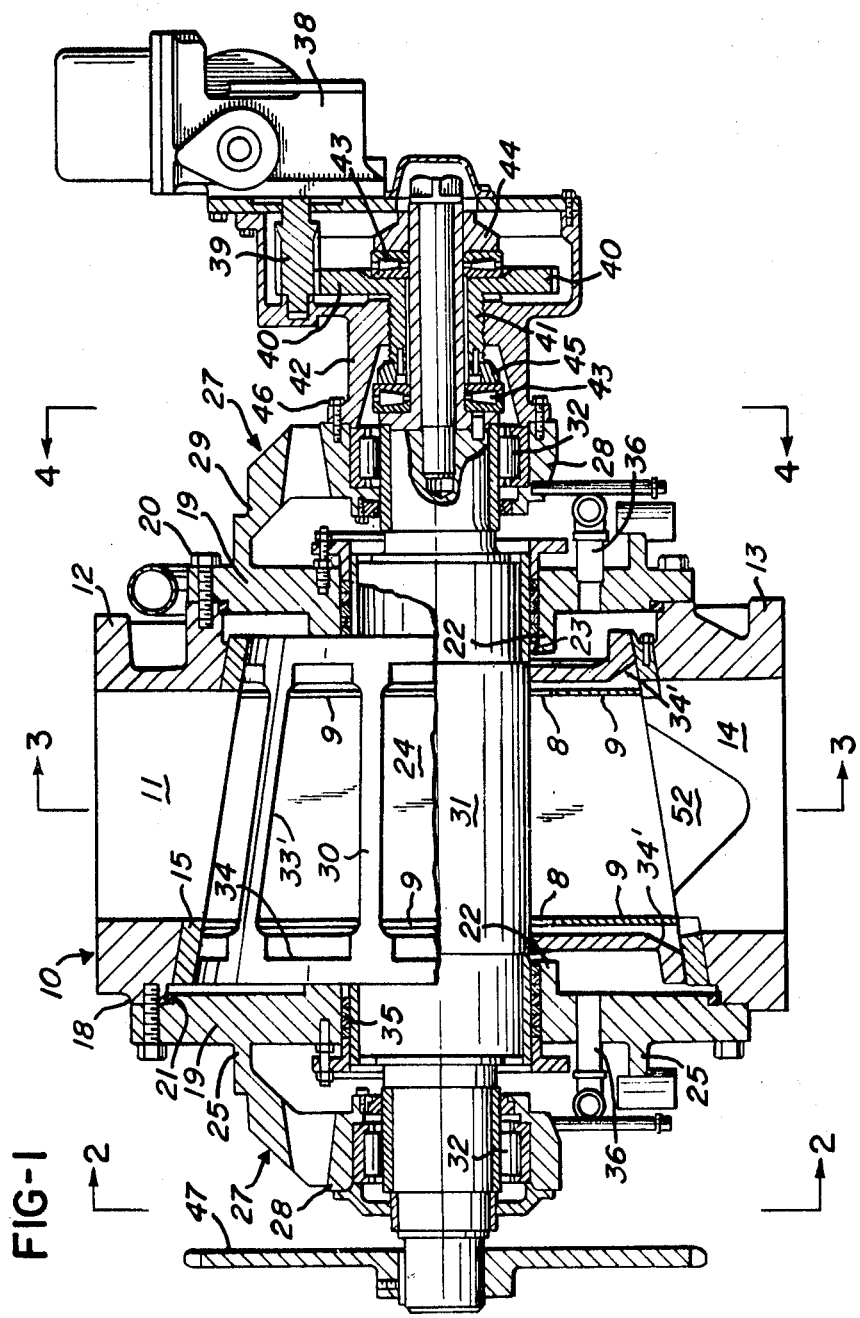
Figure 2:
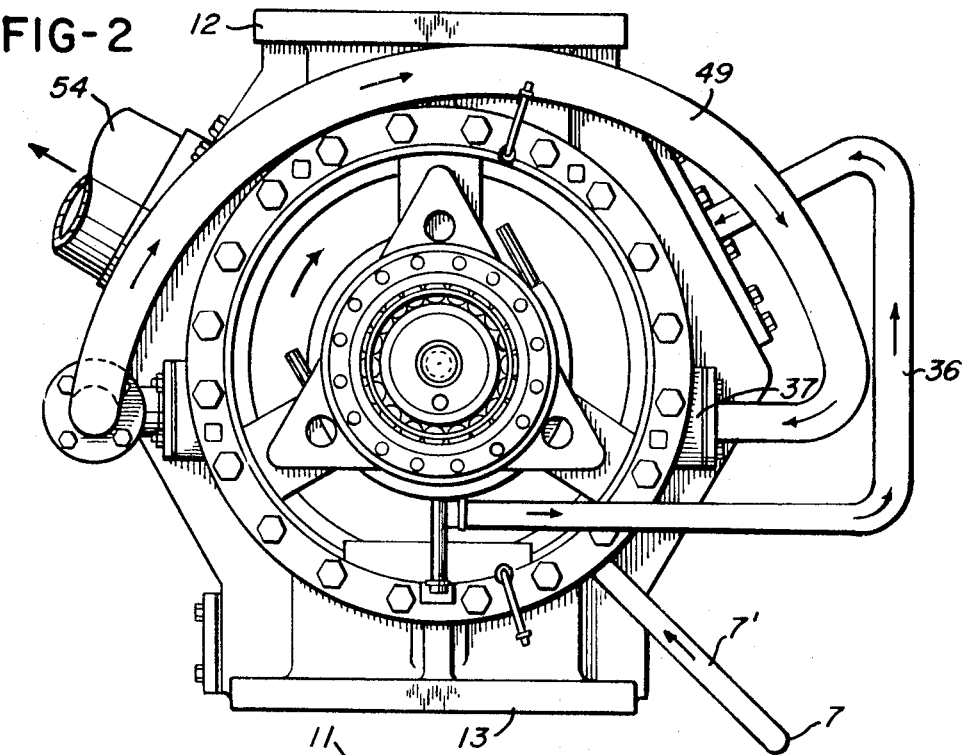
FIG. 2 is a partial sectional view taken generally on line 2—2 of FIG. 1, with conduit means shown schematically for ease of illustration.

Referring to the drawings, the rotary valve forming the subject matter of the present invention includes a generally frustoconical shell 10 providing a horizontally disposed convergent transverse through-passage open to either end. The shell 10 forms a portion of a valve housing and has at the top thereof an inlet opening 11 defined by a tubular projection 12. Dependent from the bottom of the shell is a second tubular projection 13 defining a discharge opening 14. A thin liner element 15 of generally uniform thickness is fixed coextensive with the inner surface of the shell 10 and has openings therein which align with the inlet opening 11 and the discharge opening 14. As a matter of convenience, the shell as further described includes the liner 15.

The shell 10 includes about the respective ends of the convergent through passage generally cylindrical projections 18 bridged at their projected extremities by flange plates 19. The outer peripheral portion of each plate 19 is coextensive with the projected face of the related projection 18 and fixed thereto by bolts 20. The projected face of each of the projections 18 is stepped at the inner periphery to provide a circular shoulder receiving a seal 21 confined therein by a stepped portion of the related plate 19 to form therebetween a seal.

Each plate 19 has a generally annular configuration. Its inner periphery is defined by a cylindrical hub portion 22 which projects inwardly in the direction of the shell 10. Formed integral with the projected extremity of the hub 22, within the confines of the shell 10, is an internal flange 23.

On the outermost face of each plate 19, formed integral therewith is a tubular projection 25 positioned radially outward of the hub 22. The projections 25 are each bridged by a spiderlike structure 27 the body of which is defined by a generally tubular element 28. The element 28 is displaced outwardly from the projection 25 by three equidistantly spaced relatively convergent leg portions 29 integral therewith.

Nested in the shell 10 is a valve rotor 30 having a frustoconical shape similar to that defined by the interior surface of the liner 15. The rotor 30 is formed with a circumferentially spaced series of peripheral pockets 24 which move on rotation thereof to successively pass the inlet and discharge openings 11 and 14 in a manner believed obvious. Connected with and projected outwardly from each end of the rotor 30, at least as far as the leg portions of the spider 27, is a rotor shaft 31. The respective ends of shaft 31 project through radial shaft bearings 32 contained in the tubular elements 28. A circular recess defined in each end of the rotor 30 nests the adjacent hub 22.

Nested to line the inner periphery of each of the annular plates 19 are packing glands which bridge the space between the plate and the rotor shaft. This forms a seal of the end bell cavity to either end of the rotor which is here defined in each instance by a flange plate 19 and the adjacent formed end surface of the rotor.

Referring more particularly to the rotor 30, each pocket 24 thereof has a wedgelike configuration, expanding radially outward from an arcuately rounded base 33 to smoothly merge with diverging sides 33' and end surfaces 34. The latter are substantially parallel until a point adjacent and spaced from their outer extremities where they are sloped away from each other at 34'. The portions 34' diverge to the extent their projected radial extremities are spaced a greater distance apart than the corresponding dimension of the valve inlet opening 11 and the beginning portion of the discharge opening 14 in the sense of travel of the valve rotor. The purpose of this will be further described.

Inserted in and fixed adjacent each end of each rotor pocket 24 to orient perpendicular to the rotor shaft is a wedge-shaped plate 9. The latter corresponds in shape to the radial cross section of the rotor pocket and is imperforate except that its apex at the pocket base is formed to produce in the partition defined thereby an aperture 8. Each rotor pocket is thus divided to form to either end thereof a thin pie-shaped radially oriented channel or duct communicating by way of the apex aperture 8 with the major extent of the pocket therebetween the opening to which conforms in dimension to the opening provided by the valve inlet 11.

Figure 3:
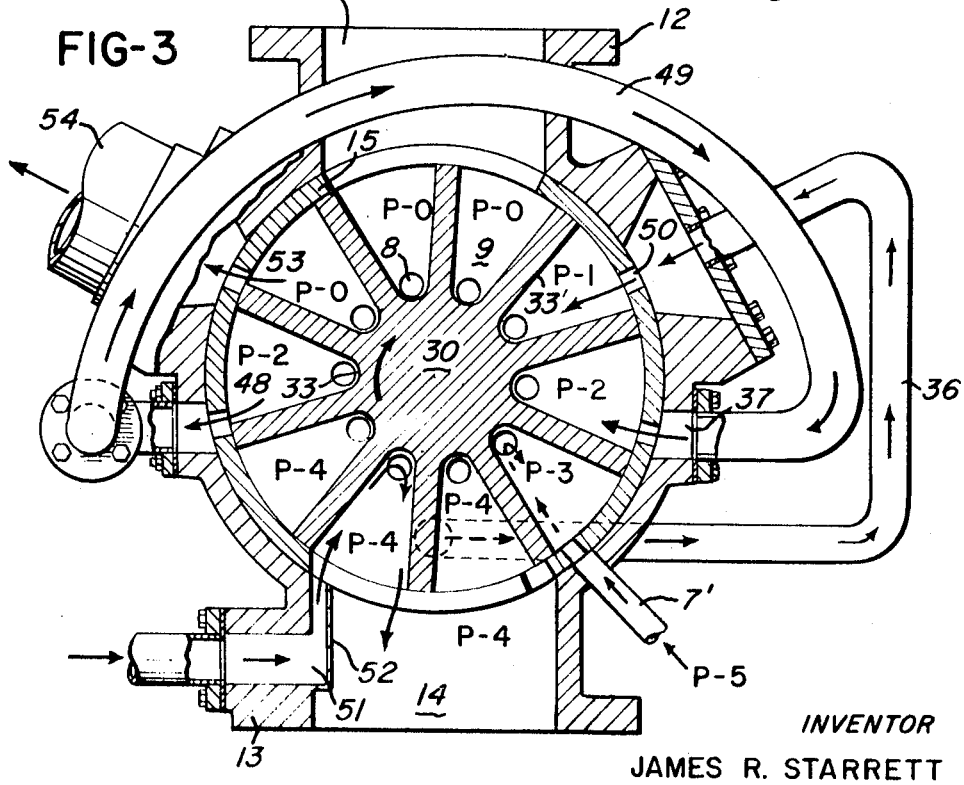
FIG. 3 is a partial sectional view taken generally on line 3—3 of FIG. 1 with conduit means similarly shown.
Figure 6:
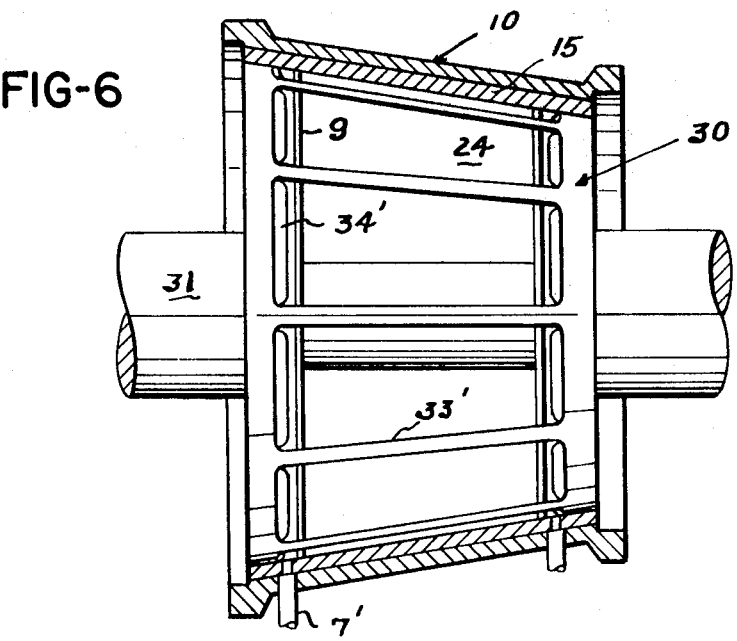
FIG. 6 is a side elevation of the valve, sectioned to show details of rotor improvements.

Communicating with the end bell cavities to either end of the rotor are conduit means 36. The ends of the conduit means 36 remote from the plates 29 are connected to communicate with the interior of the rotor shell through opening 50. The opening 50 is positioned adjacent and, as illustrated in FIG. 3, immediately following the inlet 11. The conduit means 36 function for the transfer of steam under pressure from the end bells of the valve through a path exterior to the rotor 30 to the interior of the rotor in a manner to be further described.

Positioned outwardly from the small end of the rotor, in an axial sense (to the right of FIG. 1), is a further bearing assembly (thrust) for the rotor shaft 31 and also an independent motor driven rotor positioning unit. Operation of motor 38 causes longitudinal adjustment of the rotor 30 and its shaft 31 relative the shell 10. This is achieved through rotation of pinion 39 and gear 40. Rotation of gear 40 axially adjusts an interconnected hub 41 relative its relatively fixed housing 42. Movement of the hub 41 is transferred to the rotor shaft 31 through thrust bearings 43 to either end and thrust plates 44 and 45, the latter of which are clamped to the rotor shaft to ensure their conjoint movement. The entire unit is held in position on the spiderlike structure, as seen in FIG. 1 of the drawings, by bolts 46.

Positioned outwardly from the spider 27 at the larger end of the rotor (to the left of FIG. 1) is a rotor shaft extension mounting a sprocket 47 through the medium of which power may be supplied to drive the rotor.

With reference to the drawings, it will be noted that means are also provided for transferring a portion of steam under pressure from the interior of the rotor pockets from what might be considered the discharged side of the rotary valve to the inlet side of the valve where such steam is introduced to further pressurize and condition incoming material following the receipt thereof in the rotor pockets and the application thereto of the end bell steam. Such last-mentioned means includes an outlet or an exhaust opening 48 in the one side of the valve and inlet opening 37 in the shell 10 generally opposite thereto and a conduit 49 interconnecting and providing a communication between such openings. By such means normally wasted exhaust steam under high pressure is so transferred as to perform a secondary pressurization and conditioning of the material introduced to the rotor pockets and an elevation of its temperature. This is of advantage in the example illustrated and provides an effective utilization of steam and its energy content which would otherwise be wasted.

As will be noted in the drawings, each rotor pocket is fully relieved after passing the outlet 48 by exposure to the atmosphere by way of an outlet 53 in the shell 10 and the attached conduit 54 which defines the outlet. In this manner the rotor pockets are cleared of steam and any fluid content remaining is under atmospheric pressure by the time each pocket is exposed to the inlet opening 11 for the purpose of receiving a new charge of material.

Referring to the drawings, it will be further seen that connected to the shell 10 immediately prior to the outlet 14 is the delivery end of a live steam line 7 connected to a suitable source. The delivery end of the line 7 has two branches 7' one of which opens to the pie-shaped duct or channel defined at one end of each rotor pocket immediately prior to exposure of the pocket to the valve outlet and the other opens simultaneously to the pie-shaped channel or duct defined by a plate 9 to the other end of the charged pocket.

It will be seen that the charge of material in the rotor pocket which has been first conditioned by end bell pressure and its corresponding temperature and secondarily conditioned by the slightly hotter exhaust steam vented thereto from a rotor pocket as it leaves the valve outlet, is subjected to the rear thereof to a high-pressure layer of fluid. This live steam injected at this point is under pressure higher than that in the connected pressurized vessel and is directed by plates 9 to the base of the rotor pocket, to its respective ends, and through apertures 8 to either end of the base to produce two high velocity opposed jets of steam. The introduction of steam in this manner has proven to scour the base and to lift or move the charge therefrom including any wet fine materials which have a tendency to tightly cling. The net effect is to create immediately prior to exposure of a pocket to the outlet 14 a continuous pressured rear loading of the charge. The nature of the oppositely directed flows of live steam under high pressure is such to spread the lifting layer to the sides of the pocket and the adjacent surfaces of plates 9. Thus, we achieve a storage of energy in a layer of pressure fluid surrounding the charge in the rotor pocket.

Figure 7:
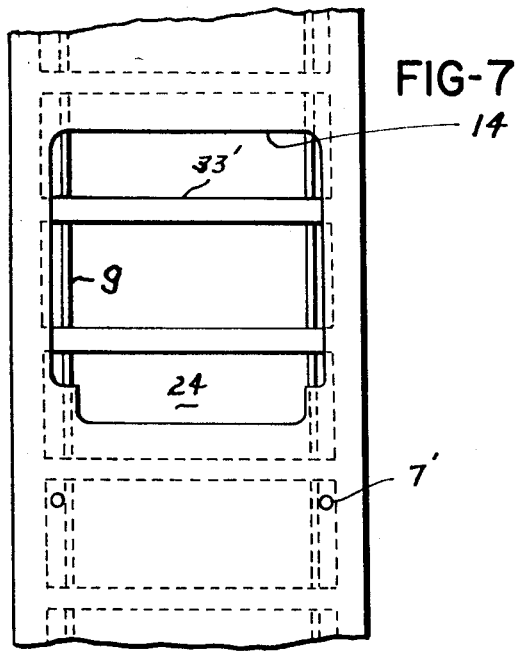
FIG. 7 is a fragmentary view showing further detail of the means providing for improved valve discharge in accordance with the present invention.

FIG. 7 of the drawings illustrates that the valve outlet 14, which is generally rectangular in this case, is narrowed to its end first traversed by the leading portion of the pocket as the pocket is exposed to the outlet. This narrowed portion dictates that in the initial exposure the pie-shaped ducts to either end of the pocket remain sealed so the full effect of the pressured layer of live steam behind the charge in the pocket may be utilized to ensure its full and forceful discharge. Attention is directed to the fact that during this initial exposure of a rotor pocket at the outlet with the ducts to either end thereof remaining sealed, there still flows to the base of the rotor pocket the live steam delivered through the conduit branches 7'. This means that there is not only a fast ejection but as the ejection occurs there is a continuing flow of live steam to assist the final purge of the pocket.

It is noted in the instance illustrated, referring to the schematic illustration in FIG. 3, that the duration of the pressure buildup behind the charge is represented by about half the distance between the rotor vanes. Further the extent of the pocket purge interval is determined at the point when approximately half a rotor pocket is exposed to the outlet 14. As the leading vane of the discharging pocket moves to the center of the outlet, the outlet is widened to expose the steam ducts to either end of the pocket so they may self purge.

Accordingly, noting FIG. 3 of the drawings, the live steam, in sequence, prepressures the charge from the rear as it forms a scouring film over the surfaces of the rotor pocket, on and between the duct or channel forming plates 9, and ensures a positive purge of the pockets continuing until the ducts for the live steam are exposed at the valve outlet to self purge.

Further, referring to FIG. 3 of the drawings, it may be seen that as the pockets of the rotor approach the far side of the discharge opening 14, supplementary steam is introduced under relatively high pressure through the conduit 51 connected in the projection 13 at the base of shell 10. Incoming fluid entering under pressure through conduit 51 is channelled upwardly into the passing rotor pocket by means of a deflecting plate 52 whereby to effect a secondary scouring of the pockets to ensure that no remnants of material are left therein.

Thus, material is removed from the pockets as described to be forcefully discharged through the outlet 14 and into the pressurized treatment vessel, in the process of which the pressures within the discharge opening 14 and the rotor pockets in register therewith become substantially equal to that existing in the treatment vessel to which the valve may be attached.

In summarizing the features of the present invention as here incorporated, the valve operation and function can be best understood in regard to the complete cycle with reference to FIG. 3. The material to be processed is introduced to each rotor pocket as it moves into registry with the inlet opening 11. It is here received, in the example illustrated, at considerably less than processing pressure, for example atmospheric pressure P-0. Since the rotor operation is continuous, the pocket continues to move and after the trailing vane of the material laden pocket passes the inlet 11, such pocket with its charge of material is moved into registry with opening 50. In the process it is thereby exposed to a preliminary pressurization and conditioning through the introduction thereto of the end bell steam under pressure. Note that the high pressure and temperature condition within the end bells is due to leakage across the rotor rims which is inherent due to the required operating clearance for the rotor. The passage for the transfer of steam and thereby a relief of the pressure and temperature in the end bell cavities is defined by the conduits 36. Thus, on exposure to the opening 50, the material in the rotor pocket has applied thereto a steam inflow which produces an increase in the temperature of the material and an increase of the pressure in the pocket to a level represented by P-1.

Following the preliminary pressurization of the charge to the level of P-1, the rotor pocket is subsequently subjected to the application of additional pressure in accordance with the invention. This secondary pressurization and conditioning occurs as the pocket referred to moves into and from registry with openings 37 in the shell 10. As the pocket so moves, there is transferred thereto steam under the higher temperature and pressure which exists in the pocket which has just passed the valve outlet. This steam transfer is by way of opening 48, conduit 49 and opening 37. This pressure may be designated as P-2 which is greater than the pressure P-1 but less than the pressure P-3 which is created in the pocket immediately preceding the valve outlet. As previously described, the pressure P-3 is achieved by the application of the live steam directed from a suitable source through conduit 7, branches 7' and ducts formed by the plates 9 in the rotor pocket at a pressure P-5.

As the rotation of the valve rotor progresses, the pertinent pocket has the leading vane commence to open to the discharge opening 14 whereupon the pocket is purged in the effective manner previously described and under the influence of a pressure P-5 created by the live steam. As the purging of a pocket is completed and the pocket continues to the far side of the outlet for its secondary scouring by the steam flowing from the conduit 51, the purged pocket will be filled with steam at a pressure P-4 corresponding to that pressure which is maintained within the communicated pressure treatment vessel secured to and about the outlet from the valve housing. As the pocket progresses past the discharge opening 14, as previously described, the purging effect of the steam introduced from the conduits 51 causes any fragments of material remaining from the forceful discharge of the pocket content to be removed from the pocket since the function continues until the pocket passes the inlet 51. The pocket is then clean of perceptible material but remains filled with steam at the high pressure P-4 as it moves into alignment with opening 48 where the initial depressurization of the pocket begins as previously described. Pressure in the pocket is reduced from P-4 to P-2 by release of the excess steam pressure through opening 48, conduit 49 and opening 37 back to the incoming side of the valve to create pressure P-2 in the pocket coming into registry with the opening 37. There is still some steam or fluid remaining in the empty pocket as it passes the opening 48 and the pocket is subsequently further depressurized to P-0 by discharge of any remaining steam under pressure through outlet 53 and conduit 54 to atmosphere. Thus, the pocket as it completes its cycle has an atmospheric pressure condition by the time it moves into registry with the inlet opening 11 to receive another charge of material.

Accordingly, it may be readily seen that there is a substantial pressure and temperature reduction effected in the end bell cavities which relieves the degree of stress across the faces of the exposed rotor ends. Further, the steam transferred from the end bells to the rotor pockets produces a primary pressurization and conditioning of material being transferred from the inlet 11 to the discharge opening 14. There is a secondary exposure of the material charge to produce thereon a pressure P-2 while the third application of the high ejecting pressure P-5 follows. This insures a graduated conditioning of the material so there is a less abrupt exposure thereof to elevated temperature and pressure which exists in the related pressurized vessel. A further incident of the end bell relief is an improved condition tending to balance the pressures applied to the rotor. Moreover, the system substantially reduces the pressure changes which normally exist across the rotor rims. The temperature and pressure changes from one end of the vanes defining the rotor pockets to the other are substantially relieved from what is normally encountered, to achieve substantial advantage in reduction of material wear and fatigue.

Thus, not only does the present valve of the example illustrated retain the improvements of the preceding family of rotary valves but it also overcomes further existing difficulties and problems in the use of the previous valves.

Further, in the process which provides for reduction of the pressure in the end bell cavities and more effective and more complete valve discharge there not only occurs a highly advantageous result in the prepressurization and conditioning of the material being processed but also a great reduction in the normally anticipated wear of the shaft seals. This is due to the fact that the pressure differential across the shaft seal is greatly reduced by the practice of the invention. The tendency for the shaft seal 35 to wear or "blow" is substantially eliminated. Moreover, the fact that the system precludes fragments from reaching the end bells contributes greatly towards increased life of the seals, results in better valve operation, lower maintenance thereon and greater efficiency for the entire rotary valve unit.

There are numerous additional advantages achieved by the end bell pressure relief as here provided including the reduction of steam leakage to the valve inlet which might interfere with the loading operation. Moreover, the invention system enables a greater efficiency of pocket to pocket relief due to the fact there is less pressure buildup in and objectionable leakage from the end bells. This is all in addition to the basic and important advantage of providing means for ensuring a more effective valve discharge, even with the most adherent of materials passing through the valve units.

The present invention therefore provides an improved rotary valve enabling a greater and more constant valve efficiency and operation and a considerable reduction of maintenance problems and part replacement normally anticipated. Furthermore, by simple utilization of the excessive steam pressure and temperature available in the end bell cavities to pressurize and condition material in the manner described, the present valve becomes one that is considerably more balanced and therefore more economical to operate. It is certainly more efficient in use.

The valve has been here described with the rotor rotating in a clockwise direction. However, it will function just the same on rotation in a counterclockwise direction, upon reversal of the pressure inlets and outlets and the appropriate application of the various required sources of conditioning fluid which may be other than steam. The fluid may be such as a liquor which would have a physical modifying effect on the material. This is contemplated in the practice of the invention here described.

From the above description it will be apparent there is thus provided a device of the character described possessing the particular features of advantage before enumerated as desirable but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown but that the means and construction herein disclosed comprise but one of several modes of putting the invention into effect.

Having thus described my invention, I claim:

1. A rotary valve including a rotor having therein a plurality of circumferentially spaced pockets, said pockets opening from the periphery of said rotor intermediate its ends, a shell-like rotor housing having an inlet thereto and an outlet therefrom, said housing peripherally encompassing said rotor to normally close said pockets as they move between said inlet and said outlet and being closed to define with at least one end of said rotor an end bell cavity, shaft means projecting from either end of said rotor and said housing and through said end bell cavity and openings in said shell-like housing, means providing a seal between said housing and said shaft means, and conduit means connected by way of said housing between said end bell cavity and the periphery of said rotor, said rotor having means for drive thereof to successively communicate said rotor pockets with said conduit means whereby to communicate end bell pressure with said pockets in the course of the movement of said pockets from said inlet to said outlet.

2. A material handling valve as set forth in claim 1 characterized by means defining openings in said shell-like housing intermediate said inlet and said outlet and to opposite sides thereof, said openings to opposite sides being interconnected by further conduit means, and said rotor pockets communicating with each of said openings in the course of rotation thereof, in the process of which the conduit means in interconnected relation to said openings provide for a flow under pressure from one to another of the so communicated pockets.

3. A material handling valve as set forth in claim 2 characterized by the conduit means interconnected with said end bell cavity being connected to said housing to open said rotor pockets immediately following their communicating with said valve inlet.

4. A rotary valve as set forth in claim 3 characterized by said further conduit means communicating a pocket in a position prior to exposure thereof to said outlet with a further pocket in a position immediately following exposure thereof to said outlet.

5. A material handling valve as set forth in claim 4 characterized by means defining a further opening through said shell-like housing to said rotor pockets immediately preceding said inlet.

6. A material handling valve as set forth in claim 4 characterized by means for directing steam under pressure directly to the base of each rotor pocket immediately prior to exposure thereof to said outlet in a manner to preload the charge therein from the rear whereby to produce a forceful ejection of the charge on exposure thereof to said outlet.

7. A material handling valve as set forth in claim 6 characterized by there being means connecting each end bell cavity with an opening in said shell means for successively communicating with said rotor pockets to balance the pressure therebetween.

8. A material handling valve as in claim 1 characterized by means in connection with said housing to produce in each rotor pocket, prior to exposure thereof to said outlet a layer of fluid to load the pocket contents from the rear whereby to produce a forceful ejection of said contents.

9. A material handling valve as in claim 1 characterized by means in connection with said housing and in said rotor pockets to produce in each rotor pocket, prior to exposure thereof to said outlet, a layer of fluid at a high velocity to scour the inner surfaces of the rotor pocket from end to end thereof, and produce behind the pocket contents stored energy functioning on exposure of the pocket to the valve outlet to produce a forceful ejection of its entire contents.

10. A material handling valve as in claim 9 wherein said outlet has a relation to said pockets to dictate that the pocket contents are first exposed to said outlet while said housing provides that the means for producing the layer of fluid in said pockets are shielded from said outlet, and means providing that the means in said pocket are then exposed to said outlet for self-purging of the areas for directing to said pocket said layer of fluid.

11. A material handling rotary valve comprising a valve housing including means defining an inlet thereto and an outlet therefrom, a rotor contained in said housing having means in connection therewith forming radially directed pockets arranged to open from the periphery and intermediate the ends thereof, the rotation of which rotor carries said pockets to successively align with said inlet and said outlet, in the process of which to receive therein a charge of material from said inlet and carry the same for discharge through said outlet, characterized by means defining a passage for delivering to the interior of said housing, immediately preceding said outlet, a flow of fluid under pressure and means in connection with said rotor adapted to form a continuation of said passage and arranged to direct fluid to the base of at least a portion of said rotor pockets as each said portion of said pockets approaches said outlet, said last-mentioned means being arranged to load said fluid in said portion of said pockets from the ends thereof whereby to preload the pocket contents from the rear so as to produce a forceful ejection of its contents on exposure thereof to said outlet.

12. A material handling valve unit as in claim 11 characterized by said end loading means being duct means opening at one end thereof from the periphery of said rotor and at the other end thereof to one end of the associated pocket, at its base surface.

13. A material handling rotary valve comprising a valve housing including means defining an inlet thereto and an outlet therefrom, a rotor contained in said housing having means in connection therewith forming pockets arranged to open from the periphery thereof, the rotation of which rotor carries said pockets to successively align with said inlet and said outlet, in the process of which to receive therein a charge of material from said inlet and carry the same for discharge through said outlet, means for delivering to the interior of said housing immediately preceding said outlet a flow of fluid under pressure and means in connection with said rotor for directing to the base of at least a portion of said rotor pockets fluid delivered from said delivering means as each said portion of said pockets approaches said outlet, said last-mentioned means being arranged to load said fluid in said portion of said pockets from the ends thereof whereby to preload the pocket contents from the rear so as to produce a forceful ejection of its contents on exposure thereof to said outlet, said end loading means being duct means opening at one end thereof from the periphery of said rotor and at the other end thereof to one end of the associated pocket, as its base surface, and said duct means being formed by an imperforate plate inserted in and adjacent to one end of a rotor pocket and having in the innermost extremity thereof an aperture for directing from said duct and across the base surface of the pocket a high velocity flow of said fluid in the sense axially of said rotor.

14. Apparatus as set forth in claim 13 characterized by each said rotor pocket having plate means forming a duct to either end thereof and said fluid delivery means being arranged to simultaneously direct fluid to each duct on alignment therewith immediately preceding said outlet whereby to produce at the base of the pocket a pair of oppositely directed, generally coaxial high velocity jets of fluid to scour the pocket base and spread over the surface thereof to preload its contents from the rear immediately prior to exposure to said outlet.

15 A material handling valve including a housing having an inlet thereto and an outlet therefrom and means forming therein at least one pocket arranged to receive and carry a charge from said inlet to said outlet for discharge through said outlet characterized by means in connection with said housing and said pocket forming means for directing fluid to the base of said pocket, in bypassing relation to the charge therein, immediately preceding exposure thereof to said outlet, to move across the said base from one end whereby to produce a scouring film of fluid on the pocket surface and preload the pocket contents from the rear.

16. A valve as in claim 15 characterized by said directing means in connection with said pocket forming means being conduit means having to at least one end of said pocket an opening limited to the inner extremity of said pocket, adjacent the base thereof, whereby to insure that the fluid will lift from the base the pocket contents so as to ensure a complete ejection thereof on exposure to said outlet.

17. Apparatus as in claim 16 characterized by said pocket being related to said outlet and said conduit means to said fluid delivery means whereby to maintain a seal of said conduit means on first exposure of said pocket to said outlet in the process of which there immediately occurs a forceful ejection of the pocket contents under the influence of the preloading from the rear, said conduit means maintaining a delivery of said fluid to scour the pocket and produce a supplemental ejecting force for the pocket contents.

18. Apparatus as set forth in claim 17 characterized by means at the far side of said outlet from said fluid delivery means for scavenging said pockets to remove remaining particles of their contents on registry of the pockets with said outlet.

19. A rotary valve comprising a rotor, a housing for said rotor having a circular bore to accommodate said rotor, said rotor being adapted to be positioned with its ends in end spaced relation to adjacent wall portions of said housing to form therewith end bell cavities with which said rotor has limited communication over the ends thereof, said rotor being formed with a circumferential series of pockets intermediate its ends, which pockets open through the periphery of said rotor, said housing having angularly displaced material inlet and outlet openings communicating with the periphery of said rotor, said rotor pockets being adapted to be brought into successive alignment with said inlet and said outlet openings and to register with said openings in the course of rotation of said rotor and means defining a connection for continuously venting said end bells to each said pocket in the course of its movement from said inlet towards said outlet opening.

20. A rotary valve as set forth in claim 19 characterized by said connection for continuously venting said end bells being conduit means connecting between at least one of said end bell cavities and a location of said housing immediately following said inlet opening whereby to communicate end bell pressure with each said pocket when the pocket leaves said inlet opening.

21. A rotary valve as set forth in claim 20 characterized by conduit means connecting between said end bells and opening through said housing to respectively opposite ends of each rotor pocket in passage of said rotor pockets thereby.

22. Apparatus as set forth in claim 21 characterized by each said rotor pocket having defined to either end thereof a generally radial passage to direct end bell pressure to the base of the related pocket in bypassing relation to the major portion of the charge therein.

23. Apparatus as set forth in claim 22 characterized by said housing outlet opening having irregular configuration whereby as each said pocket moves to register with said outlet the passages to either end thereof are first sealed and then exposed in the course of registration and there being means in connection with said housing to direct a further flow of fluid pressure to each of said pockets in the course of the approach and the exposure thereof to said outlet opening.